United States Patent Office 3,405,117
Patented Oct. 8, 1968

3,405,117
α-CHLORO-DI-p-XYLYLENES
Ying L. Yeh, Highland Park, N.J., assignor to Union Carbide Corporation, a corporation of New York
No Drawing. Filed Dec. 24, 1964, Ser. No. 421,116
2 Claims. (Cl. 260—649)

ABSTRACT OF THE DISCLOSURE

This invention discloses alpha chlorinated di-p-xylylenes and the method of preparing them free of interfering ring chlorination from the cyclic dimer-di-p-xylylenes.

---

This invention relates to alpha chlorinated derivatives of the cyclic dimer, di-p-xylylene. More particularly, this invention relates to alpha chlorinated di-p-xylylenes and a method for preparing the same substantially free of interfering ring chlorination.

Recently, it has been found that extremely thin, yet continuous, polymeric films can be vapor deposited onto a wide variety of substrate surfaces. Foremost, among such vapor-deposited polymers are those of the p-xylylene family. p-Xylylene polymers are insoluble in every common organic solvent at room temperature and are tough, moisture resistant and exhibit low permeability to most vapors. These polymers have been found to remain tough and flexible over a wide range of temperatures, thus providing an excellent dielectric material for use in electronic applications.

It has also been recently found that the substantially insoluble unsaturated p-xylylene polymers such as those having the general repeating unit

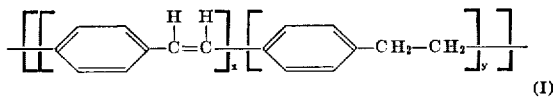

(I)

wherein x is a number from 3 to 10, inclusive, and y is a number from 0 to about 3, inclusive, can be photo-oxidized to base-soluble derivatives thereof by exposing said polymer to light in the presence of oxygen for a sufficient period of time to render the polymer soluble. The ability of the unsaturated p-xylylene polymers to undergo photo-oxidation enables their use in photomasking applications thereby enhancing their usefulness in electronic applications.

One of the most convenient methods of obtaining an ultra-thin coating of substantially unsaturated p-xylylene polymer on a substrate is through the deposition of a p-xylylene polymer containing labile atoms on the alpha carbons which can be eliminated in situ by thermal cleavage or other means to form the unsaturated species. For example, in instances wherein the p-xylylene polymer applied to the substrate has the general repeating unit:

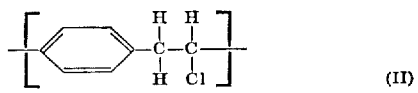

(II)

a molecule of HCl can be eliminated by thermal treatment or other similar means to cause dehydrochlorination to provide a substantially unsaturated p-xylylene polymer (I).

The method found most convenient and preferred for obtaining alpha substituted p-xylylene polymers (II) is the pyrolysis of at least one cyclic dimer represented generally by the formula

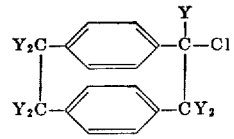

(III)

wherein Y is a member selected from the group consisting of hydrogen and chlorine, at temperatures between about 400° C. and 700° C.

The pyrolysis of the cyclic dimer (III) occurs at temperatures exceeding 400° C., and most advantageously, at temperatures between about 550° C. and 700° C. Pyrolysis results in the quantitative cleavage of the cyclic dimer and the formation of reactive diradicals having the structure

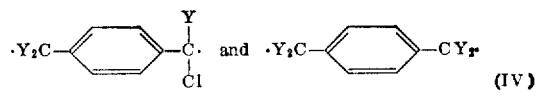

(IV)

wherein Y is as defined above.

Preferably, the cyclic dimer is first sublimed at low temperatures before pyrolysis. Sublimation of the cyclic dimer commences at temperatures above at least about 100° C. The primary step of sublimation rather than direct pyrolysis is used to prevent local overheating and degradation of the dimer and also to insure a more efficient pyrolysis.

Pyrolysis of the cyclic dimer is preferably conducted at reduced or subatmospheric pressures. For most operations, pressures within the range of about 0.0001 to 10 mm. Hg are most practical although higher pressures can, of course, be employed.

The diradicals formed in the manner described above impinge on the substrate surface, said surface being maintained at temperatures below the condensation temperature of the diradicals, and upon condensing thereon spontaneously polymerize to form a continuous uniform coating of a truly linear p-xylene polymer comprised of the repeating units:

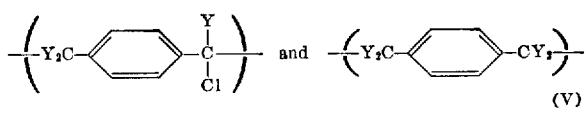

(V)

wherein Y is as defined above. Simply by heating the thus coated substrate, dehydrochlorination occurs resulting in the unsaturated photo-oxidizable p-xylylene polymer (I).

Heretofore, one of the primary reasons for employing other methods to obtain the unsaturated p-xylylene polymers rather than the more convenient in situ conversion via pyrolysis of the cyclic dimer (III) was the problem of obtaining an alpha chlorinated di-p-xylylene substantially free of ring chlorination. As used herein, the term "substantially free of ring chlorination" means less than about one percent of ring chlorination. Ring chlorination increases the molecular weight of the cyclic dimer thereby necessitating the use of higher temperatures in order to sublime the cyclic dimer prior to pyrolysis. Unfortunately, higher temperatures result in dehydrochlorination prior to sublimation, resulting in the formation of unsaturated cyclic dimers such as:

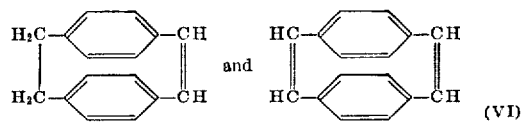

(VI)

The unsaturated cyclic dimers, when pyrolyzed, however, do not result in poly-p-xylylene-type films.

Accordingly, it is an object of the present invention to provide alpha chlorinated di-p-xylylenes substantially free of ring chlorination and a method for the preparation thereof.

The present invention provides alpha-chlorinated di-p-xylylenes having the general formula:

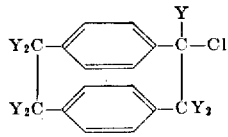

wherein Y is a member selected from the group consisting of hydrogen and chlorine. It has been found in accordance with the present invention that alpha-chlorinated di-p-xylylenes as defined above substantially free of ring chlorination can be produced by reacting di-p-xylylene with sulfuryl chloride in the presence of a free radical initiator. Employing the above method has enabled the production of alpha chlorinated di-p-xylylene substantially free of ring chlorination, i.e., less than about one percent of ring chlorinated impurities.

The alpha chlorinated di-p-xylylenes produced by the method defined above are obtained as a mixture of alpha chlorinated products, i.e., alpha-mono-chloro-di-p-xylylene, alpha-di-chloro-di-p-xylylene and so on up to and including alpha-octa-chloro-di-p-xylylene. The major product in the mixture can be selectively controlled regulating the molar proportions of sulfuryl chloride to di-p-xylylene. For example, when the desired major product is alpha-mono-chloro-di-p-xylylene, i.e.,

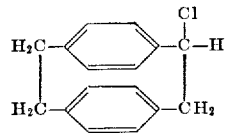

sulfuryl chloride is reacted with di-p-xylylene in at least stoichiometric proportions, i.e., a molar ratio of 1:1, although an excess of sulfuryl chloride over the stoichiometric requirement is preferred to insure complete reaction. When the desired major product is one exhibiting a higher degree of alpha chlorination, the molar ratio of sulfuryl chloride to di-p-xylylene correspondingly increases, e.g., in the preparation of alpha-octa-chloro-di-p-xylylene, the molar ratio is 8:1, although as above described, an excess of sulfuryl chloride, most desirably at least about 25 percent excess, is preferred to insure complete reaction.

The reactants are reacted in the presence of a free radical initiator. Both photochemical and/or chemical free radical initiators can be employed to promote the free radical reaction. The reaction mixture can be subjected to a photochemical free radical initiator such as ultraviolet irradiation preferably from a light source exhibiting wave lengths less than about 500 millimicrons. Also, the reactants can be admixed with a catalytic quantity, i.e., about 0.1 gram, of a chemical free radical initiator such as the organic or inorganic peroxides as, for example, benzoyl peroxide, the hydroperoxides such as tert.-butyl hydroperoxide, as well as other chemical free-radical initiators such as azo bis-iso-butyronitrile. It is considered preferable, however, in order to decrease the time required for complete reaction, that both photochemical and chemical free radical initiators be employed. For example, the reactants are admixed with a catalytic quantity of a chemical free radical initiator and the resulting mixture is subjected to ultraviolet irradiation.

The reaction rate is primarily a direct function of temperature; however, due to the steric hinderance and the strain inherent in the di-p-xylylene molecule, as the degree of alpha substitution increases the reaction becomes sluggish requiring a proportionately longer reaction time for complete reaction. Moreover, as the degree of substitution increases the reaction temperature must be decreased commensurately to prevent dehydrochlorination across the methylene bridges of the cyclic dimer. For example, in the preparation of alpha-mono-chloro-di-p-xylylene the reaction can be conducted at the reflux temperature of the solvent whereas in the preparation of alpha-trichloro-di-p-xylylene, the reaction proceeds at room temperature. For even a higher degree of substitution, reaction temperatures down to about −25° C. can be employed. Thus, by the phrase "reaction temperature commensurate with the degree of alpha-substitution" it is meant that the reaction temperature is to be decreased sufficiently to prevent dehydrochlorination or decomposition of the molecule as the degree of alpha chlorination increases. The precise reaction temperature for a given degree of alpha substitution can be easily determined. In general, the reaction temperature can range from −25° C. to about 1000 C. depending on the degree of substitution.

The ultimate separation and recovery of the products from the resulting reaction mixture can be conveniently accomplished by conventional chromatographic separation techniques.

The present invention is further illustrated by the following examples. These examples are merely illustrative and are not to be construed in derogation of the spirit or scope of the present invention. Unless otherwise specified all parts and percentages are by weight.

EXAMPLE 1

In a two-necked, one liter round bottom flask equipped with a magnetic stirrer, a condenser, a drying tube and a gas inlet, there was placed 10.4 grams of di-p-xylylene, 500 milliliters of dry carbon tetrachloride, 0.1 gram of benzoyl peroxide and 5 milliliters of sulfuryl chloride. The resulting mixture was irradiated with an ultraviolet lamp while the mixture was stirred under a positive pressure of a dry inert gas. The mixture was heated to reflux for about 3½ hours under ultraviolet irradiation. After the reaction period, the mixture was cooled to room temperature and passed through a column of neutral alumina (Woehm, activity one) to remove any impurities contained therein. After exhaustively eluting the column with carbon tetrachloride, the resulting carbon tetrachloride solution was concentrated to dryness in vacuo. Vapor phase chromatographic analysis of the product indicated the following composition: di-p-xylylene 22.6 percent; alpha-mono-chloro-di-p-xylylene, 56.3 percent; alpha-di-chloro-di-p-xylylene, 17.8 percent; and minor impurities of unknown nature comprising 3.3 percent.

The product thus obtained was admixed with 50 ml. of benzene. The benzene insoluble portion was eliminated by filtration. The resulting benzene solution was subjected to chromatrographic treatment using a 10 percent carbon tetrachloride/90 percent n-hexane mixture as the sole eluent. The column was packed with neutral alumina (Woehm, activity one) in hexane, and the amount of alumina used was about 40 times the weight of the chlorinated product. The column was eluted with the above-defined eluent and the eluent was collected in 100 ml. fractions. Each fraction was examined for its composition. Di-p-xylylene was eluted first followed by alpha-mono-chloro-di-p-xylylene which was followed in turn by a small portion of alpha-di-chloro-di-xylylene. The fractions containing at least 80 percent pure alpha-mono-chloro-di-p-xylylene were combined and concentrated in vacuo. Repetition of the chomatographic purification, followed by recrystallization from n-hexane gave a white, crystalline alapha-mono-chloro-di-p-xylylene having the formula:

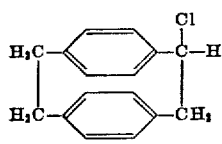

and exhibiting a melting point of 124–124.5° C., in 8–10 percent yield. The material was found to be greater than 99 percent pure.

EXAMPLE II

Employing the method described in Example 1, the reaction product obtained was subjected to chromatographic treatment to remove most of the alpha-monochloro-di-p-xylylene from the neutral alumina column. Thereafter, alpha-dichloro-di-p-xylylene was eluted from the column with an eluent comprised of 50 percent carbon tetrachloride in n-hexane. After recrystallization from an ethanol-water solution, a white, crystalline alpha-dichloro-di-p-xylylene was obtained exhibiting a melting point of 168–170° C. The material was analyzed for chlorine content as follows:

Calculated for $C_{16}H_{14}Cl_2$: Cl, 25.6. Found: Cl, 23.41.

The material exhibited a broad, tailing peak in vapor phase chromatographic analysis indicating that a mixture of structural isomers were obtained as follows:

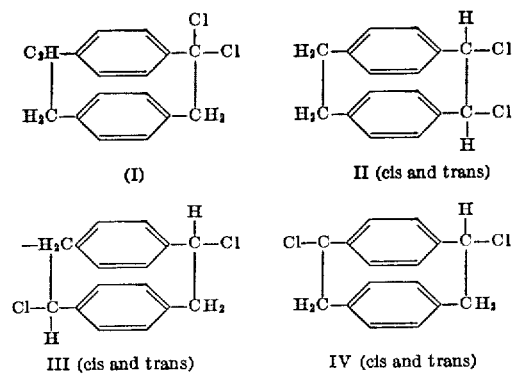

EXAMPLE III

In a two-necked, one liter round bottom flask equipped with a magnetic stirrer, a condenser, a drying tube and a gas inlet, there was placed 20.8 grams of di-p-xylylene, 500 milliliters of dry carbon tetrachloride, 0.1 gram of benzoyl peroxide and 65.2 milliliters of sulfuryl chloride. The resulting mixture was irradiated with an ultraviolet lamp while the mixture was stirred under a positive pressure of a dry inert gas. The mixture was subjected to ultraviolet irradiation at room temperature for 10 hours. After the reaction period, the mixture was passed through a column of neutral alumina (Woehm, activity one) to remove impurities contained therein. After exhaustively eluting the column with benzene, the resulting solution was concentrated to dryness in vacuo. The material was analyzed for chloride content and the result confirmed the major product as alpha-trichloro-di-p-xylylene:

Calcuated for $C_{16}H_{13}Cl_3$: Cl, 41.2. Found: Cl, 40.93.

There are several structural isomers of alpha-trichloro-di-p-xylylene, as, for example:

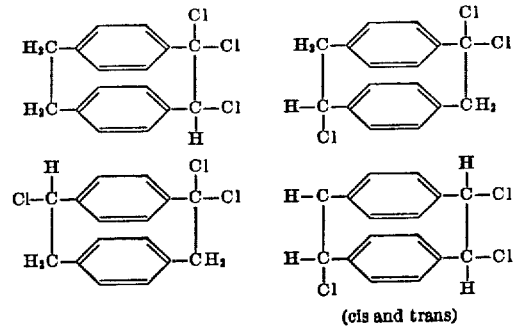

(cis and trans)

EXAMPLE IV

Fifty milligrams of alpha chlorinated di-p-xylylene as prepared in Example I was placed within a boro-silicate glass sublimation chamber measuring 2 inches in diameter and 4 inches long. A thermocouple gauge registered the pressure at one end of the chamber, the other end of said chamber being connected by a standard taper joint to a 1⅜ inch diameter quartz pyrolysis tube 26 inches long. The alpha chlorinated di-p-xylylene was sublimed at an outside temperature of about 150° C. and a pressure of about 0.2 mm. Hg. The vapors passed through a 6 inch section of the pyrolysis tube (vaporization zone) heated to 200° C. and then through a 19 inch length (pyrolysis zone) maintained at temperatures between about 600° C.–650° C. Connected to the terminal portion of the pyrolysis tube via a 6 inch long flanged dome was a deposition chamber 3 inches in diameter and 15 inches long. Excess vapors were condensed in a Dry Ice-acetone trap. A 4 c.f.m. vacuum pump maintained the pressure at about 0.015 mm. Hg. Quartz slides were placed in the deposition zone.

The alpha chlorinated di-p-xylylene sublimed and was pyrolyzed to form alpha chloro-p-xylylene diradicals which condensed and polymerized in the deposition zone which was maintained at room temperature to form a coating of poly(α-chloro-p-xylylene) on the quartz slides. There was no evidence of significant loss in the chlorine content through dehydrogchlorination during the polymerization process.

The coated quartz slides were removed from the deposition chamber and heated at 175° C. for one hour. Upon heating, the polymeric coating dehydrochlorinated resulting in a yellow-green color in the film. Ultraviolet spectroscopy indicated a broad, jagged peak between 300 and 400 mμ, log E about 4.3 which is consistent with the highly conjugated structure of unsaturated poly-p-xylylene (I) supra. After heating, the coated slides were exposed to a 140 watt high pressure mercury lamp and were bleached colorless in 2 to 5 minutes. The exposed film was completely and rapidly soluble in 2 percent aqueous sodium hydroxide solution.

What is claimed is:

1. Alpha-monochloro-di-p-xylylene.

2. The mixture of partially alpha-chlorinated di-p-xylylenes prepared by irradiating an admixture of di-p-xylylene and sulfuryl chloride in at least stoichiometric proportions in the presence of a catalytic amount of a free radical initiator at a temperature of from about −25 to 100 C. with ultraviolet irradiation, said mixture containing alpha-chlorinated di-p-xylylenes having the general formula:

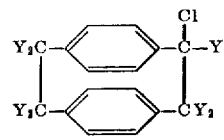

wherein Y is a member selected from the group consisting of hydrogen and chlorine and which contain at least 6 alpha hydrogens.

References Cited

UNITED STATES PATENTS 2,302,228   11/1942   Kharasch et al. __ 250—651 XR

OTHER REFERENCES

Dewhirst et al.: J. Am. Chem. Soc., vol. 80, pp. 3115ff (1958).

LEON ZITVER, *Primary Examiner.*

H. T. MARS, *Assistant Examiner.*